United States Patent
Tobey et al.

[15] 3,695,411
[45] Oct. 3, 1972

[54] CONVEYING SYSTEM AND APPARATUS FOR FEEDING SOFT CAKE PRODUCTS

[72] Inventors: Hubert E. Tobey, Maywood; George O. Moller, Dumont; Richard L. Twiford, Teaneck, all of N.J.

[73] Assignee: International Telephone and Telegraph Corporation, Nutley, N.J.

[22] Filed: Jan. 11, 1971

[21] Appl. No.: 105,446

[52] U.S. Cl. ................................................198/29
[51] Int. Cl. ............................................B65g 47/22
[58] Field of Search.....198/29, 31 AA, 32, 33 AB, 33 AC, 198/34

[56] References Cited

UNITED STATES PATENTS

| | | | |
|---|---|---|---|
| 2,959,269 | 11/1960 | Kammerer | 198/32 X |
| 1,674,419 | 6/1928 | Titus | 198/33 AC |
| 3,485,339 | 12/1969 | Miller et al. | 198/34 |
| 3,144,740 | 8/1964 | Erickson et al. | 198/33 AC X |

FOREIGN PATENTS OR APPLICATIONS

747,317  4/1956  Great Britain...............198/76

*Primary Examiner*—Richard E. Aegerter
*Assistant Examiner*—Douglas D. Watts
*Attorney*—C. Cornell Remsen, Jr., Walter J. Baum, Paul W. Hemminger, Charles L. Johnson, Jr., Philip M. Bolton, Edward Goldberg, Menotti J. Lombardi, Jr. and Isidore Togut

[57] ABSTRACT

A conveying system and apparatus is disclosed for feeding soft cake products into a packaging machine for wrapping the products individually or in a twin pack. The conveying system includes a pair of feed lines which are coupled to receive the soft cake products and convey them to a packaging machine. Each of the feed lines includes an accumulating means for accumulating the received products in a first direction, a turn-around conveyor for turning the product from the first direction to the second direction, a turn-over conveyor means for orienting said product in the second direction, and means is coupled for providing a predetermined spacing between the oriented products. A turn-in conveyor in each line then feeds the products into a central feed line of a wrapping machine, and a means is provided to position the product prior to wrapping.

8 Claims, 13 Drawing Figures

PATENTED OCT 3 1972

INVENTORS
HUBERT E. TOBEY
GEORGE O. MOLLER
BY RICHARD L. TWIFORD
ATTORNEY

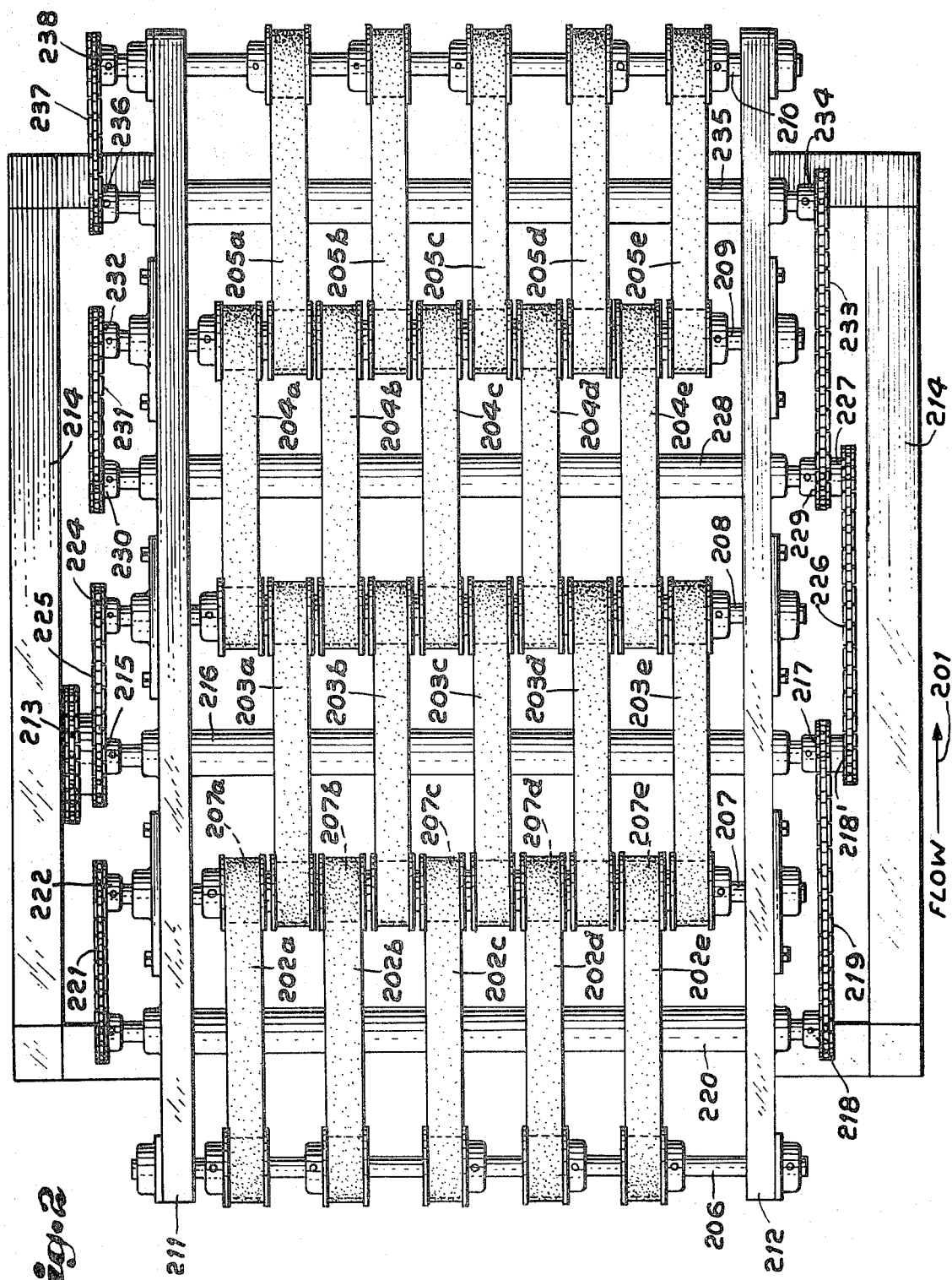

INVENTORS
HUBERT E. TOBEY
GEORGE O. MOLLER
RICHARD L. TWIFORD

BY

ATTORNEY

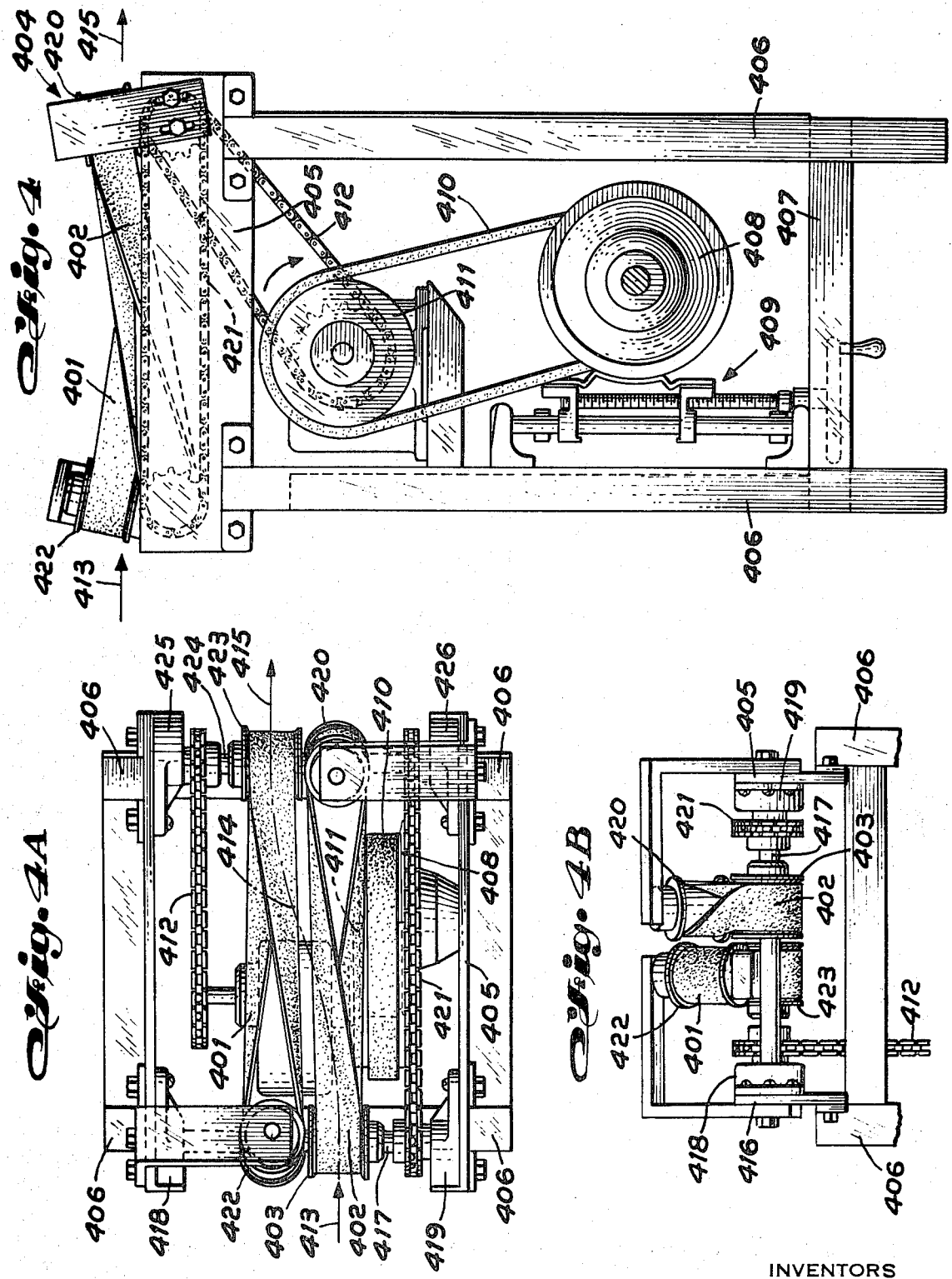

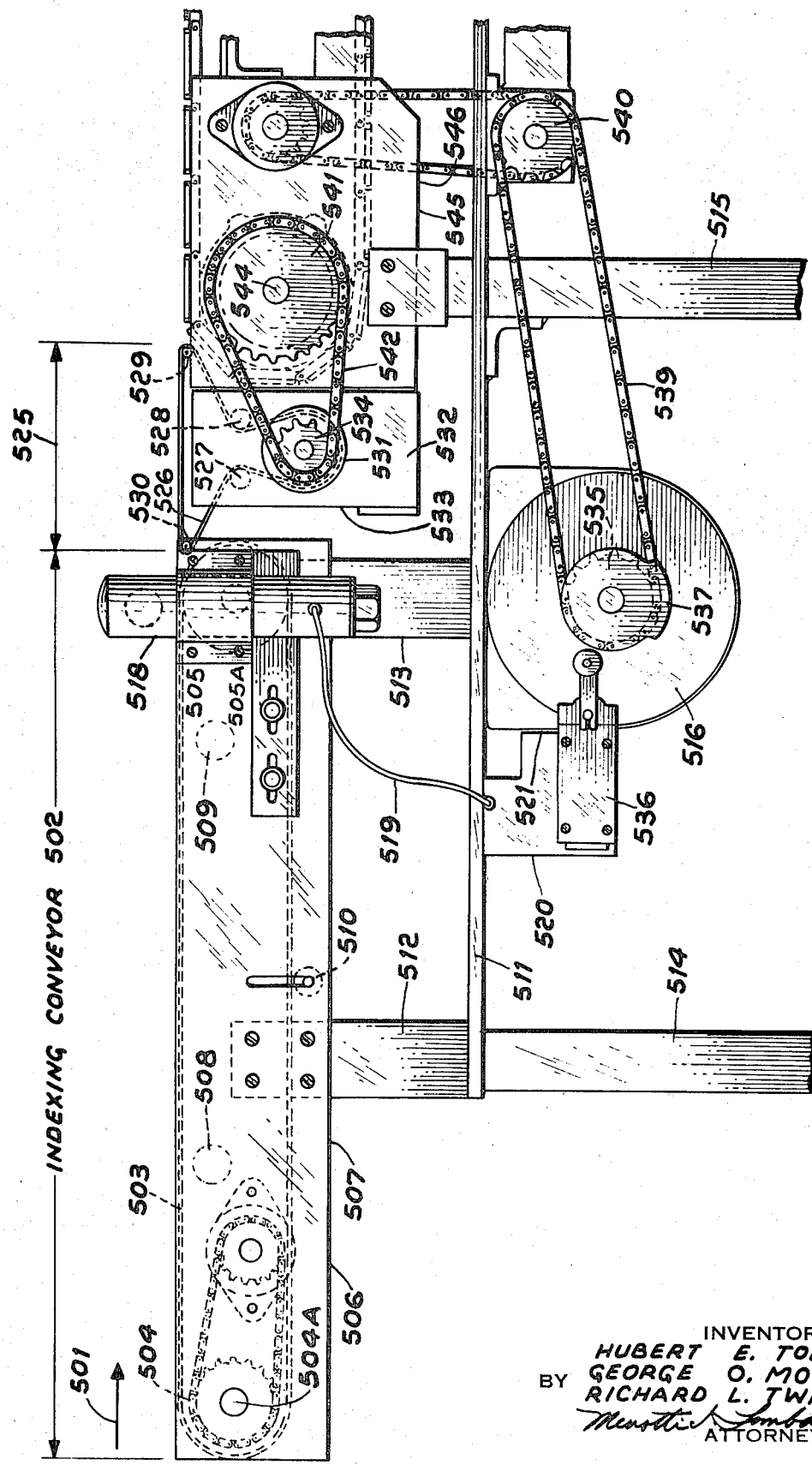

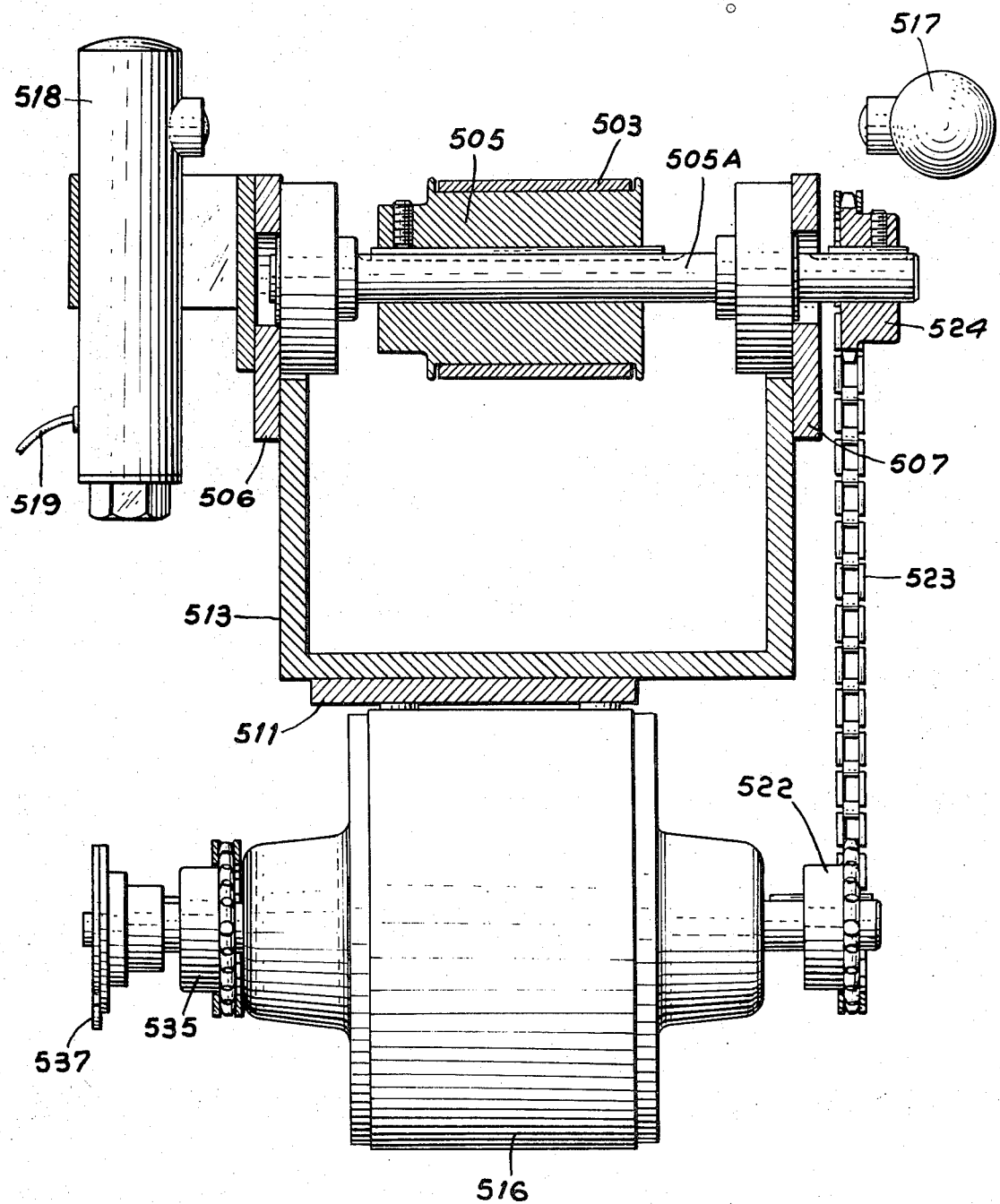

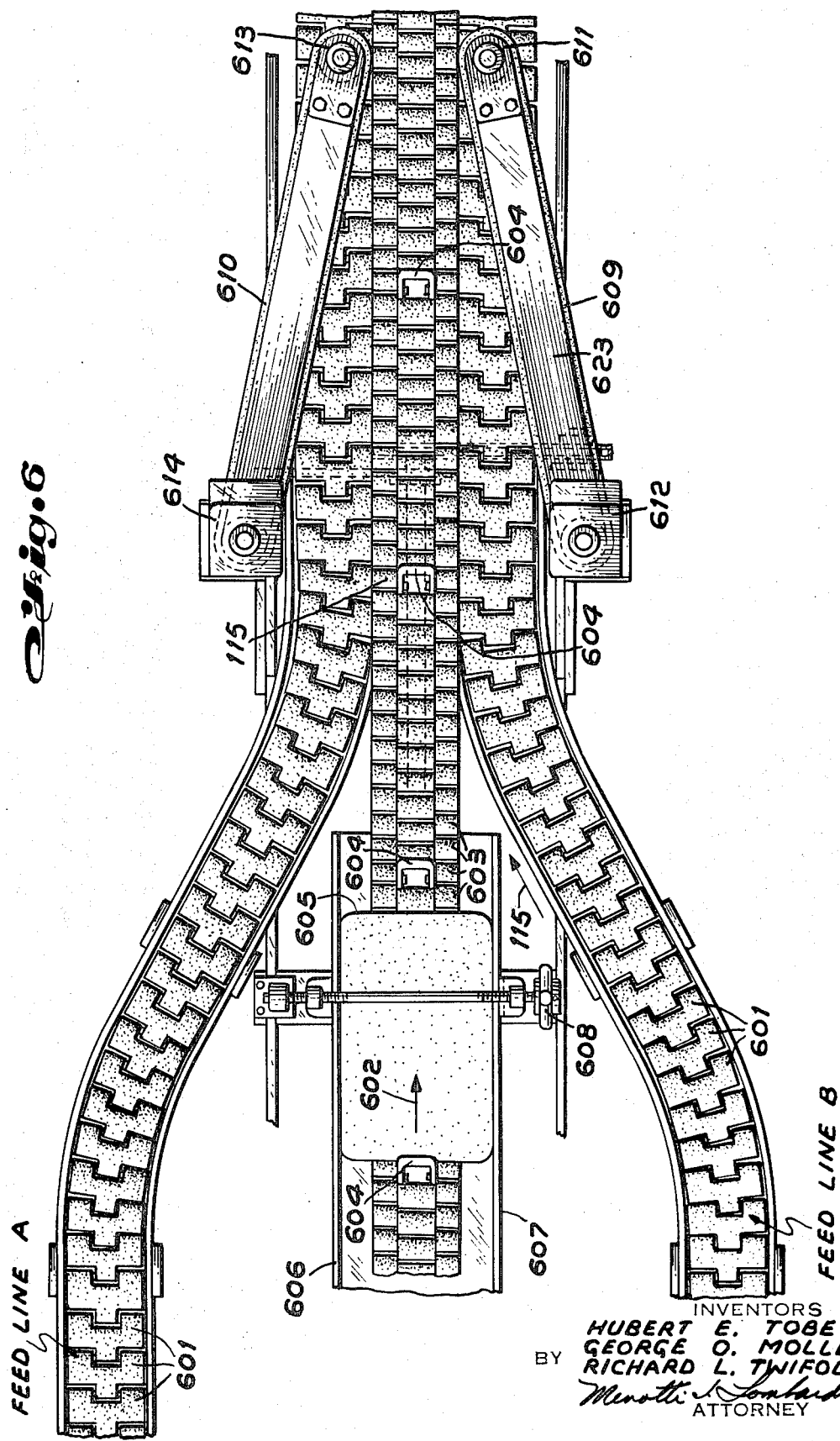

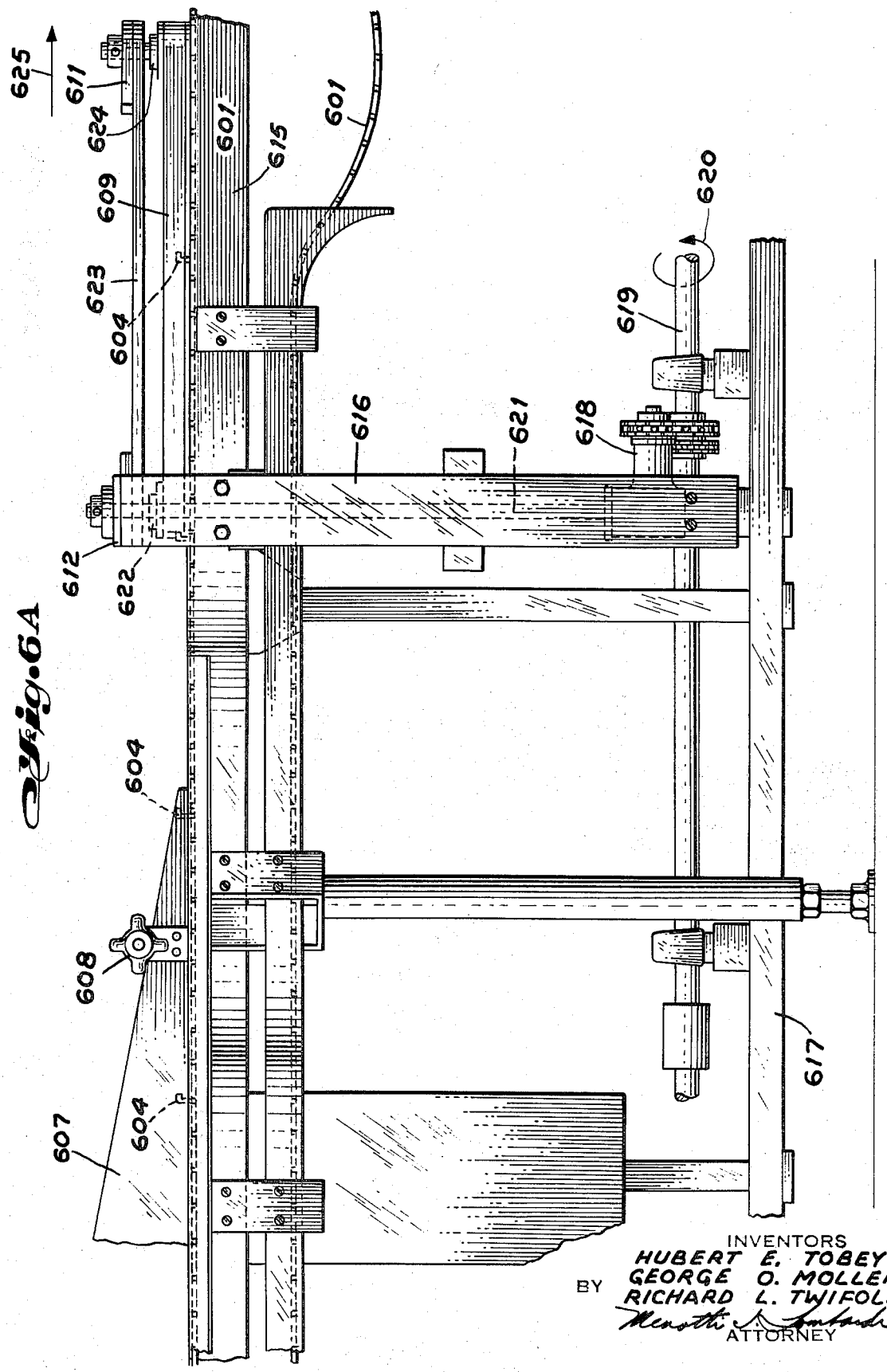

CONVEYING SYSTEM AND APPARATUS FOR FEEDING SOFT CAKE PRODUCTS

BACKGROUND OF THE INVENTION

In general, this invention relates to improved means for handling soft cake products, and more particularly, to a conveying system and apparatus for automatically feeding elongated soft cake products in a manner suitable for wrapping and packaging by a machine.

In high speed production of baked goods such as soft cake products which may be cream filled and/or iced, careful machine handling is required so that the items retain their characteristic shape and appearance while being handled in an efficient continuous manner. The soft cake products generally have a specific geometrical shape and must be moved from a baking location to a packaging location. The intermediate machine handling requires changing the relative position of the products so that the geometrical shape is compatible with the machine requirements, and moving the products at a uniform rate and speed required by the machine. The conveying system must not only be able to feed the product at the predetermined rate of the machine, but it must feed with a desired spacing between the items.

This is especially true with soft cake products having an elongated shape requiring that they be correctly oriented in the conveying system for the wrapping machine. These problems are further enhanced when the elongated soft cake is to be wrapped in a twin pack with two items side by side. Therefore, the conveying system must include arrangements for properly orienting the position of the product so that it is properly fed to a wrapping machine when wrapped as a single or a double unit.

SUMMARY OF THE INVENTION

It is therefore an object of the present invention to provide an improved conveying system and apparatus for handling soft cake products.

Another object of the present invention is to provide an improved conveying system and apparatus for continuously handling soft cake products for feeding a wrapping machine.

A further object of the invention is to provide a conveying system and apparatus for feeding elongated soft cake products in a continuous and high speed manner suitable for subsequent wrapping and packaging.

A still further object of the present invention is to provide apparatus for handling elongated soft baked goods in a conveyor system organized for high speed feeding of the goods into a packaging machine for wrapping individually or in a twin pack.

According to the broader aspects of the invention there is provided a conveying system and apparatus for feeding soft cake products into a packaging machine including a feeding line having means for accumulating said product, means for turning-around said accumulated product from a first direction to a second direction, means coupled for orienting said product from a first position to a second position in said second direction, means for inserting a predetermined spacing between individual ones of the oriented products, and means for smoothly transferring and turning-in said product for wrapping in said packaging machine.

According to a feature of the invention, apparatus is provided for conveying and feeding elongated soft cake products into a packaging position including a plurality of feed lines for feeding said packaging position, means for feeding each of said lines with products oriented with their long axis perpendicular to said conveying direction, means in each of said feed lines for turning said product so that their long axis is in line with said conveying direction, means in each of said feed lines for turning-over said products from a first orientation to a second orientation in the conveying direction, means in each of said feed lines coupled for providing a predetermined spacing between each of said products, and means coupled for merging a first and second feed line with a packaging machine feed line.

BRIEF DESCRIPTION OF THE DRAWINGS

The invention will best be understood if the specification is read in connection with the accompanying drawings, in which:

FIG. 2 illustrates a plan view of the accumulating means according to the invention;

FIGS. 4, 4a and 4b illustrate the turn-over conveyor according to the invention;

FIGS. 5 and 5a show the indexing, smooth transfer, and a portion of the turn-in conveyor according to the invention; and FIGS. 6 and 6a illustrate features of the turn-in conveyor for feeding a standard wrapping machine according to the invention.

DESCRIPTION OF THE PREFERRED EMBODIMENTS

Figure 1:
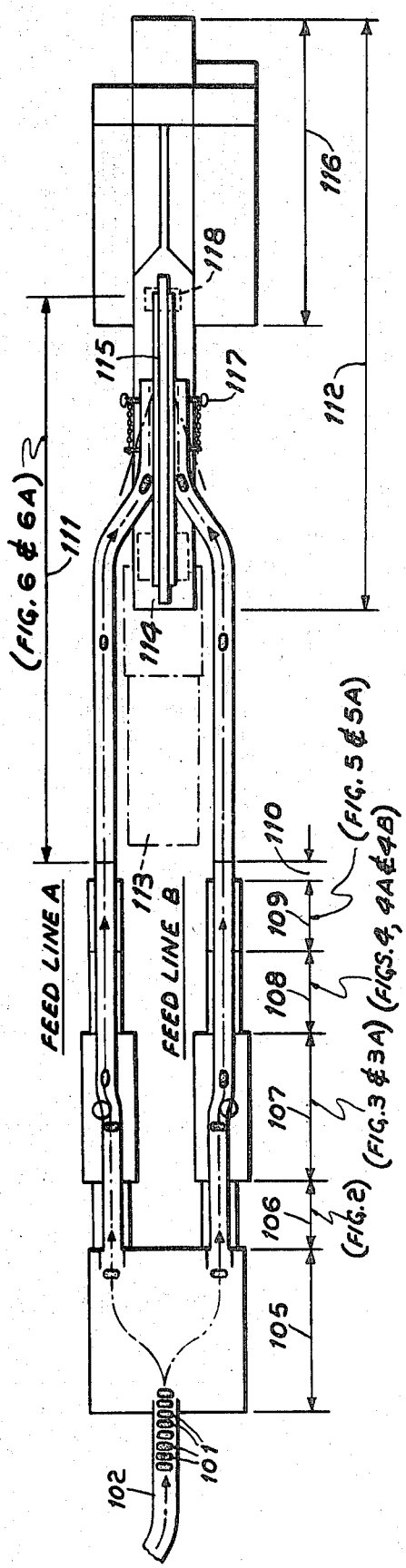
FIG. 1 illustrates the general arrangement of the conveying system and apparatus for soft cake products according to the invention.

FIG. 1 illustrates the general arrangement of a conveying system and apparatus for soft cake products according to the invention. The soft cake product 101, as more specifically shown in FIG. 1a may be a cream filled, iced or a plain soft cake product having the illustrated elongated shape including a long axis 101a, a flat like bottom 101b, and contour sides and top portions 101c. According to the general arrangement, the soft cake product is loaded from the ovens or cream filler machine onto an input conveyor 102 moving at a fixed rate of speed. The overall arrangement will accumulate the products, turn and feed them to a wrapping machine to be wrapped in a twin pack in the manner illustrated in FIG. 1b. The soft cake products 101 are positioned on their side on a cardboard base 103 and sealed by a cellophane type wrapper 104. The arrangement illustrated permits speeds of 250 wrapping units per minute.

After the cake has been placed on the input conveyor 102, it is passed to an oscillating 1 to 2 switch conveyor 105 which couples and alternates the feed of the cake 101 between feed line A and feed line B. It should be understood that it is also possible to directly feed a feed line A and B, or to eliminate one feed line completely. According to the preferred mode of operation, a standard type switching conveyor, such as produced by Metramatic Corporation of Landing, New Jersey, identified as Model LD12-2, couples the input conveyor 102 to the feed lines. The accumulator means 106 feeds a turn-around conveyor 107 in order to stack the cakes prior to their being fed to the turn-around conveyor 107. The turn-around conveyor 107 is coupled to a turn-over conveyor 108 which feeds an indexing conveyor 109 and smooth transfer conveyor 110. The turn-in conveyor means 111 which is adjustable by means 117 on its tracks, couples the cakes to a standard wrapper and conveying arrangement 112 such as marketed by "Doughboy Manufacturing Company" including a cardboard feeder 113 portion (shown in dashed lines), a conveying portion 114 having a center conveying chain 115 and a product positioner 118, and a wrapping portion 116.

Figure 1B:
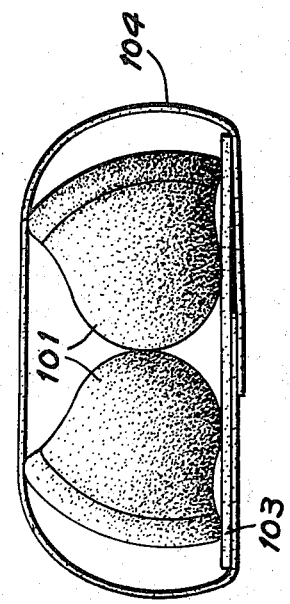
FIGS. 1a and 1b illustrate a typical soft cake and package arrangement.
Figure 1A:
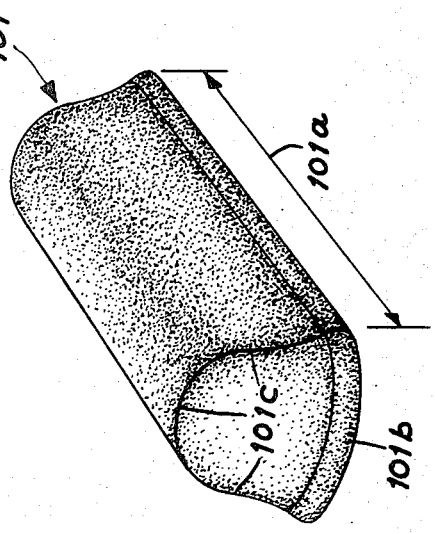

It should be evident from the drawing that feed lines A and B are constituted in the same manner and can be operated individually when wrapping a single soft cake product 101 rather than the twin pack illustrated in FIG. 1b. A cardboard support 103 in a single pack is optional. Further, when utilizing a single package rather than the twin package, the turn-over conveyor 108 is not required in the feed line and may be replaced by a straight idler conveyor portion if desired. However, the arrangement as described may be utilized by leaving the turn-over conveyor in place and operating only one of the feed lines.

Referring now to FIG. 2, a plan view of the accumulating means according to the invention is illustrated. The cake products are accumulated in the direction indicated by flow arrow 201. The accumulator comprises a plurality of groups of accumulating belts 202, 203, 204 and 205. The belts 202 through 205 are rotatably mounted on shafts 206, 207, 208, 209 and 210. The shafts being rotatably mounted on frame members 211 and 212. The drive sprocket wheel 213 is driven by a drive motor (not shown) mounted to the support base 214. Sprocket wheels 213 and 215 are mounted on through shaft 216. Shaft 216, on its opposite end, supports sprocket wheels 217 and 218. Wheel 217 is coupled to wheel 218 via a chain coupling 219. Sprocket wheels 218 and 221 are mounted on through shaft 220, and sprocket wheel 221 is connected to sprocket wheel 222 via coupling 223. Wheel 222 drives shaft 207 and via associated belt mounting pulleys 207a–e the speed of accumulator belts 202a through 202e. Slotted wheel 224 is coupled to wheel 215 via coupling 225 to drive shaft 208 and the pulley mounted accumulator belts 203a through 203e. Sprocket wheel 218 via chain drive 226 is coupled to sprocket wheel 227 which is mounted to through shaft 228 on which is also mounted wheels 229, 230. Sprocket wheel 230 is coupled via coupling 231 to sprocket wheel 232 to drive shaft 209 and the pulley mounted accumulator belts 204a through 204e. Sprocket wheel 229 is coupled by coupling 233 to wheel 234 which is mounted on through shaft 235. Shaft 235 also mounts sprocket wheel 236 which is coupled by chain 237 to sprocket wheel 238. Wheel 238 is mounted to shaft 210 to drive the pulley mounted accumulator belts 205a through 205e.

It should be well understood by those skilled in the art, that by a proper design ratio of sprocket wheels and couplings, the overall speed ratio of the accumulator can be controlled. According to a preferred embodiment, the plurality of belts 202a through 202e are traveling at 110 linear feet per minute, the accumulator belts 203a through 203e are traveling at 90 linear feet per minute, the accumulator belts 204a through 204e are traveling at 70 linear feet per minute, and the accumulator belts 205a through 205e are traveling at 45 linear feet per minute.

Referring back to FIG. 1, the switching convertor 105 will couple the cake products 101 to the group of belts 202a through 202e at approximately 70 linear feet per minute. These are then accelerated to 110 linear feet per minute and slowed down so that they may be accumulated and stacked side by side with their overall length being perpendicular to the direction of flow, and the product leaves the accumulator at approximately 45 linear feet per minute.

Figure 3:
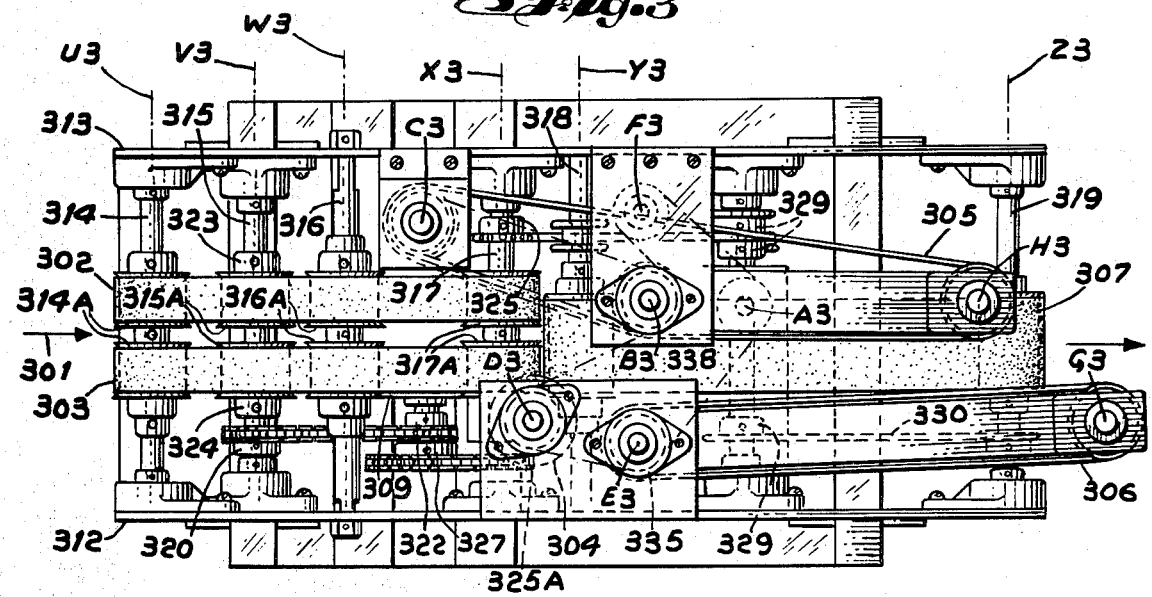
FIGS. 3 and 3a illustrate the turn-around conveyor according to the invention.
Figure 3A:
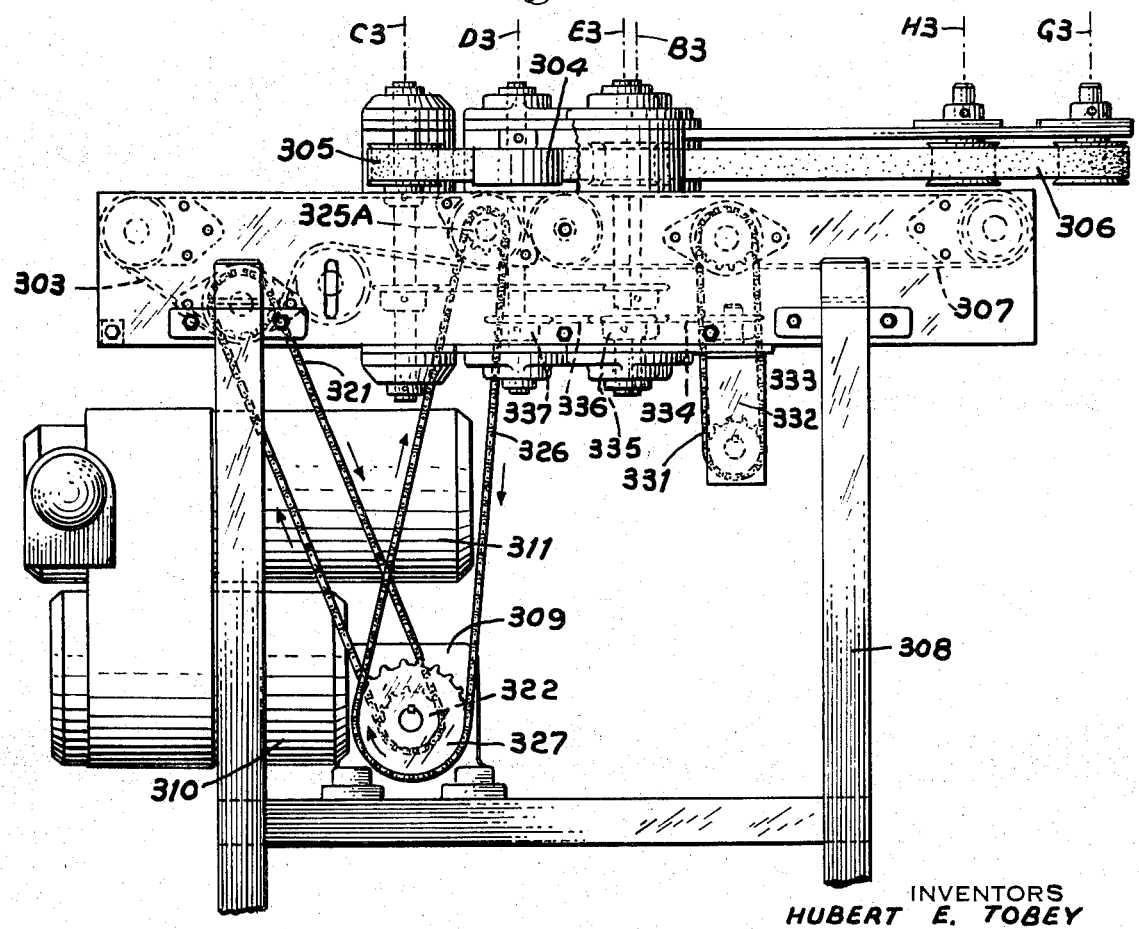

The turn-around conveyor 107 is illustrated in FIGS. 3 and 3a. FIG. 3 is a plan view of the turn-around conveyor in which the products move perpendicular to the direction indicated by flow arrow 301. The products are turned by two driven parallel belts 302 and 303 which have different speeds, a turn-around roller 304, and cooperating side belts 305 and 306. The products are moved out of the apparatus in a single line by belt 307 to the turnover conveyor. The following structural details are connected to control and drive the belts and roller to accomplish the turning action.

In FIG. 3a, the frame 308 mounts a gear reduction 309 and motor means 310 and 311. The side frame members 312 and 313 mount shaft members 314, 315, 316, 317, 318 and 319 on axes indicated respectively as U3, V3, W3, X3, Y3 and Z3. Turn-around wheel 304 is mounted on axis D3 and the side belts 305 and 306 are respectively mounted about axes C3, B3, H3 and E3, G3. The drive for parallel belts 302 and 303 is by sprocket wheel 320 which is coupled via link 321 to output pulley 322 of gear box 309. The two speeds of parallel belts 302 and 303 are accomplished via different diameter gear pulley members 323 and 324, the inside surface of the belt being ribbed to mesh with the members 323, 324. The belt rotates about the rotatable pulley mountings 314A, 316A and 317A which are fixed to the respective shafts 314, 316 and 317. Shafts 314, 315, 317 are rotatably mounted and shafts 316, 318 are fixed to the side members 312 and 313. Sprocket wheel 325a is coupled via chain link 326 to the output pulley 327 of gear box 309. The sprocket 325 is coupled via chain link 328 to a three coupling pulley 329. The three coupling pulley 329 is coupled via link 330 to shaft 319 on axis Z3, and via link 331 to right angle drive means 332. Right angle drive means 332 connects sprocket wheel 333 via link 334 to sprocket wheel 335 to provide rotation of belt 306 about axes E3, G3. Sprocket wheel 335 is further connected via link 336 to sprocket wheel 337 to provide rotation of roller 304 about axis D3. As illustrated in dashed lines in FIG. 3, the chain link 338 is mounted about axial pulleys A3, F3, B3 and around D3 and E3 which supply the rotating power to the belt 305.

In a preferred embodiment and referring additionally to FIG. 1, the cake products move from the accumulator 106 at 45 linear feet per minute and perpendicular to the two parallel input belts 302, 303, the apparatus illustrated has the proper gear ratio so that belt 302 moves at 105 linear feet per minute and belt 303 moves at 90 linear feet per minute. This speed together with the tacky texture of the fresh baked cake product causes one end of its elongated shape to lead the other end and with the aid of turning wheel 304 and slant portion of belt 305 both completes the turning and individual lining of the parallel cake products so that they move between parallel sides of belts 305 and 306 and onto belt 307. Wheel 304 moves at 380 linear feet per minute and belts 305, 306, 307 travel at the same speed of 220 linear feet per minute. Therefore, the two parallel unequal speed belts 302 and 303 cooperate initially to cause the angular turning of the oblong cake product and with the aid of the turning roller 304 and the angular sloped portion of belt 305 opposite roller 304 causes the complete turn-in of the product so that it moves on belt 307 past the axial section line Y3. The products are in a single file and conveyed to turn-over conveyor 108.

Referring now to FIGS. 4, 4a and 4b, a turn-over conveyor according to the invention is illustrated. FIG. 4 illustrates a pair of turn-over belts 401 and 402 which are pulley mounted by means 403 and 404. The turn-over belts are mounted in side frame 405 which is supported by structure means 406 and 407. A motor 408 is mounted by means 409 to the structural members 406 and 407 and is coupled by drive belt 410 to gear reduction means 411. The gear reduction member 411 is coupled via link means 412 to drive one of the belts, the other belt is driven by a similar link to 412 which is not shown for simplicity.

FIG. 4a illustrates a top plan view of the conveyor and FIG. 4b illustrates a partial end view of the turn-over conveyor according to FIG. 4. The products flow in direction of arrow 413 in single file on belt 402 following dashed line 414 and are turned on the side by the cooperation of the half twist belts 402 and 401, the product then exiting on belt 401 in the direction of flow arrow 415. Belts 401 and 402 are half twisted about the pulley mounts 403, 420, 422, 423 which are rotatably mounted on the side frame members 405 and 416. Pulley mount 403 is rotatably mounted on shaft 417 through bearing mounts 418 and 419 to the frame side walls. The belt 412 imparts the motion of the gear reducer to the pulley belt arrangements 402, 403 and 420. Belt 421 drives the belt 401 on pulley mountings 422 and 423. Pulley 423 of belt 401 is mounted by shaft 424 to bearing mounts 425, 426 to side walls.

In summary and referring again to FIG. 1, the products are turned in a turn-around conveyor 107 and pass single file into turn-over conveyor 108. The product moving in the direction of arrow 413 is turned in cooperation with half twist turn-over belts 402 and 401 following the dotted line 414 and exist on their side so that they are in the position illustrated in FIG. 1b for wrapping.

Referring now to FIGS. 5 and 5a there is illustrated a side and plan view of the indexing conveyor portion, the smooth transfer conveyor portion and beginning of the turn-in conveyor portion. The product is traveling in the direction of arrow 501 on the indexing conveyor 502. The indexing conveyor includes a belt 503 which is rotatably mounted on pulleys 504, 505 and through shafts 504a, 505a to side mounting panels 506, 507. The conveyor also includes panel supports 508, 509, a belt tension pulley 510, and frame means 511, 512, 513, 514, 515. A motor-clutch arrangement 516 is mounted to frame support means 511 and provides both a continuous and an intermediate motion for this arrangement.

A standard photo-cell arrangement 517, 518 is positioned on the indexing conveyor and coupled by lines 519 to control means 520 which is coupled by line 521 to control the intermittent operation of clutch pulley 522. A cam operated micro switch 536 is included to override the photo-cell operation. Clutch pulley 522 is coupled by chain drive 523 to sprocket wheel 524 mounted on shaft 505a to control the intermittent motion of belt 503 according to the predetermined timing of photo-cell arrangement 517, 518 and control box 520. This timing is well known, and provides the indexing or spacing between individual products to be delivered to the smooth transfer conveyor portion 525.

The smooth conveyor portion comprises a plurality of belts 526 positioned about means 527, 528, 529, 530, 531. These means are mounted by side panels 532, 533 and are driven by sprocket wheel 534 as hereinafter described.

The motor-clutch arrangement 516 includes, at an input end opposite the pulley 522, a continuous motion input drive pulley 535 which is coupled to cam 537. The drive from sprocket wheel 535 is provided by chain link 539 to sprocket wheel 540 which in turn is directly coupled to sprocket wheel drive 541 and via chain link 542 to drive sprocket wheel 534 to provide the motion for the continuous smooth transfer of the product from the indexing to the turn-in conveyor.

The sprocket wheels 541 and 540 of the turn-in conveyor are traveling in the direction of arrow 542 and mounted by shaft 544 in panels 545, 546.

According to the arrangement illustrated in FIGS. 5 and 5a, the products are intermittently fed from the indexing conveyor to the smooth transfer conveyor and onto the turn-in conveyor portion which couples the products to wrapper and conveying arrangement 112 (FIG. 1). Further details of the conveyor arrangement according to the invention will now be described in connection with FIGS. 6 and 6a.

Referring now to FIGS. 6 and 6a, FIG. 6 illustrates feed lines A and B comprising a series of chain link belts 601. These belts are coupled from smooth transfer conveyor portion illustrated in FIGS. 5 and 5a and positioned to angle in and run along side center conveying chain 115 (of FIG. 1). The movement is in direction of arrow 602. The center conveying chain 115 comprises a plurality of chain links 603 and a plurality of spaced lugs 604. The spaced lugs 604 are positioned to convey card 605 in the conveying direction. The card is fed from a card feeder 113 (not shown) and between adjustable card guide 606, 607. The adjustment guides 606, 607 is made by adjusting means 608 as shown in FIG. 1 by means 117, the turn-in conveyor has a pair of adjustable tracks, and chain links 601 ride on top of chain links 603, this allows the product to move from chain links 601 onto the cardboard being moved by lugs 604. The turn-in conveyor includes a pair of rotating turn-in guide belts 609, 610 which are rotatably mounted, respectively, about pulley means 611, 612, 613 and 614. The product moving on the guide belt chain line 601 is thereby inserted between the lugs 604 and onto the card 605.

FIG. 6a illustrates further features of the turn-in conveyor, wherein the chain links 601 are carried on the chain link support frame 615. The turn-in guide belt bracket 616 is mounted to a lower frame member 617. The bracket 616 supports a right angle gearing means 618 which is coupled to input drive shaft 619 rotating in direction of arrow 620. The drive may be obtained directly from the wrapping machine or by an individual drive motor. The gearing means 618 is coupled by shaft 621 to pulley mount 612. The belt 609 is mounted about rotatable pulleys 622 and by extension 623 and means 611 about pulley 624. The lugs 604 propel the card 605 and the product turned-in by belts 609, 610 in the direction of arrow 625.

Thus, the in-feed of the products to the wrapping machine is accomplished by the conveyor system and apparatus according to the described invention. Each of the feed lines A and B accumulates, turns-around, turns-over, indexes, and smoothly transfers the soft cake products to a turn-in conveyor belt arrangement which cooperates with a standard wrapping machine which then wraps the product in the manner illustrated in FIG. 1b.

Although I have described my invention in connection with specific apparatus, it should be clearly understood that this description is made only by way of example and is not to be considered a limitation on the scope of the invention as set forth in the objects and features thereof and in the accompanying claims.

We claim:

1. In a conveying system, apparatus for feeding elongated soft cake products into a packaging machine, a feed line comprising:
   means for accumulating said products in a first direction with the long axis of the products perpendicular to the conveying direction;
   means coupled to said accumulating means for turning-around said accumulated products from said first direction to a second direction in which the long axis of the products is in line with the conveying direction;
   means coupled to said turn-around means for orienting said products as received in a first position to a second position with the long axis still in said second direction;
   indexing means coupled to receive said oriented products for providing predetermined spacing between individual ones of said oriented products; and
   means coupled to said indexing means for smoothly transferring and turning-in said product for wrapping.

2. In a conveying system, apparatus for feeding elongated soft cake products into a wrapping machine to provide a twin package, the apparatus including:
   means for feeding said products to a first feed line and a second feed line with said products positioned with their long axis perpendicular to the conveying direction;
   said first and second feed lines each comprising
      accumulator means including a plurality of groups of accumulator belts for accumulating and stacking said fed products side by side;
      turn-around conveyor means coupled to receive said accumulated and stacked products for turning said products from a first direction to a second direction in which the long axis of the products is in line with the conveying direction;
      turn-over conveyor means coupled to receive said turned products for orienting said products in another posi-tion in said second direction;
      indexing means coupled to said turn-over means for pro-viding a predetermined spacing between individual ones of said oriented products; and
      a smooth transfer conveyor and turn-in conveyor coupled to said indexing means for feeding said products into a feed line of the wrapping machine; and
   turn-in belt means mounted to and cooperating with said turn-in conveyor of said first and second feed lines to cause a pair of said products to be positioned so that they may be packaged as a unit.

3. A conveying system and apparatus for feeding elongated soft cake products into a wrapping machine comprising:
   an input conveyor carrying a multiplicity of said products in a first direction with the long axis of said products transverse to said conveying direction;
   accumulator means coupled to said input conveyor for accumulating said products in said first direction;
   a turn-around conveyor coupled to receive said accumulated products, including a turn-around wheel positioned to change the direction of said product from said first direction to a direction in which the long axis of said products is in line with said conveying direction;
   an indexing arrangement coupled to receive said turned-around products and to provide a predetermined spacing between each of the products; and
   transfer and turn-in means coupled to said indexing means for feeding said products into said wrapping machine.

4. Apparatus for conveying and feeding of elongated soft cake products into a packaging position including:
   a plurality of feed lines;
   means for feeding each of said lines with products in a first orientation and positioned so that the elongated axis is in a first direction relative to said conveying direction;
   means in each of said feed lines coupled to said feeding means for turning said products from said first direction to a second direction so that the elongated axis is in line with said conveying direction;
   means in each of said feed lines coupled to said turning means for turning-over said products from said first orientation to a second orientation and with the elongated axis in said conveying direction;
   means in each of said feed lines coupled to said turn-over means for providing a predetermined spacing between each of said products; and
   means coupled to said spacing means for merging first and sec-ond feed lines with a packaging feed line to convey said products into the packaging position.

5. A conveying system and apparatus for feeding soft cake products having an elongated shape into a packaging machine, a feed line comprising:
   means for accumulating said products with their long axis perpendicular to the conveying direction;

means coupled to receive said accumulated products and to turn them so that their long axis is in the conveying direction;

means coupled to said turning means for orienting said product from a first position to a second position in said long axis direction;

indexing means coupled to said orienting means for providing predetermined spacing between individual ones of said products; and means coupled to said indexing means for coupling said product to said packaging machine.

6. In a conveying system, apparatus for feeding soft cake products into a wrapping machine to provide a twin package, said products having a generally elongated shape and contour sides and top and the apparatus including:

a first and second feed line for feeding the products into the conveying system, said first and second feed lines carry a multiplicity of said products in a first direction with the long axis of the products perpendicular to the conveying direction;

said first and second feed lines each comprising accumulator means coupled to receive said products for accumulating and stacking said products side by side in said first direction perpendicular to its long axis;

turn-around conveyor means coupled to said accumulator means for turning said products from said first direction to a second direction with their long axis in line with the conveying direction;

turn-over conveyor means coupled to receive said turned-around products and to orient said products in another position so that they are conveyed on their contour side and with their long axis in the conveying direction;

means coupled to said turn-over means for providing a predetermined spacing between individual ones of said products; and a smooth transfer conveyor and turn-in conveyor coupled to said spacing means for feeding said products into a feed line of the wrapping machine; and turn-in belt means cooperating with said turn-in conveyor of said first and second feed lines to cause a pair of said products to be packaged as a unit.

7. A conveying system and apparatus for feeding elongated soft cake products into a wrapping machine comprising:

an input conveyor carrying a multiplicity of said products in a first direction with the long axis of the products perpendicular to said conveying direction;

accumulator means comprising a plurality of groups of accumulating belts coupled to said input conveyor for accumulating and stacking said products side by side with the long axis perpendicular to the conveying direction;

a turn-around conveyor fed by said accumulator means including a turn-around wheel cooperating to change the direction of said products from said first direction to a second direction in which the long axis of the products is in line with said conveying direction;

means coupled to receive said turned-around products and to provide a predetermined spacing between individual ones of said products; and transfer and turn-in means coupled to receive said spaced products and to feed said products into said wrapping machine.

8. Apparatus for conveying and feeding of elongated soft cake products having contour sides and top portions and a relatively flat bottom, the apparatus comprising:

a plurality of feed lines;

means for feeding each of said lines with products oriented with their long axis perpendicular to said conveying direction;

means in each of said feed lines coupled to said feeding means for turning said products so that their long axis is in line with said conveying direction;

means in each of said feed lines coupled to said turning means for turning-over said products so that they are conveyed on their contour sides and with their long axis in line with the conveying direction;

means in each of said feed lines coupled to said turn-over means for providing predetermined spacing between each of said turned-over products; and means coupled to said spacing means for merging first and second feed lines and to convey said products into a packaging position.

* * * * *